United States Patent
Zhang et al.

(10) Patent No.: US 10,558,261 B1
(45) Date of Patent: Feb. 11, 2020

(54) SENSOR DATA COMPRESSION

(71) Applicant: Facebook Technologies, LLC, Menlo Park, CA (US)

(72) Inventors: Boyang Zhang, Cupertino, CA (US); Adrian Brian Ratter, Redwood City, CA (US); Chengyuan Yan, Fremont, CA (US); Jack Hood Profit, Jr., Vashon, WA (US); Paul Austin Buckley, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/174,017

(22) Filed: Oct. 29, 2018

(51) Int. Cl.
*G06F 3/01* (2006.01)
*H04W 4/80* (2018.01)
*G06F 3/0346* (2013.01)

(52) U.S. Cl.
CPC ............ *G06F 3/011* (2013.01); *G06F 3/0346* (2013.01); *H04W 4/80* (2018.02)

(58) Field of Classification Search
CPC .......... G06F 3/015; G06F 3/011; G06F 3/016; G06F 3/017; G06F 3/014; G06F 3/0484; G02B 27/017; H04W 4/80
See application file for complete search history.

(56) References Cited

U.S. PATENT DOCUMENTS

| | | | | |
|---|---|---|---|---|
| 7,489,731 | B2 * | 2/2009 | Coulson | H04L 27/2647 370/206 |
| 2006/0109376 | A1 * | 5/2006 | Chaffee | G05B 19/0423 348/423.1 |
| 2007/0296822 | A1 * | 12/2007 | Lan | H04N 21/4126 348/211.99 |
| 2008/0140338 | A1 * | 6/2008 | No | G01C 22/006 702/141 |
| 2011/0254760 | A1 * | 10/2011 | Lloyd | G01P 15/00 345/156 |
| 2014/0198034 | A1 * | 7/2014 | Bailey | G06F 3/014 345/156 |
| 2015/0362331 | A1 * | 12/2015 | Sanchez | G01R 33/02 702/153 |
| 2016/0198322 | A1 * | 7/2016 | Pitis | H04W 4/18 455/420 |

(Continued)

*Primary Examiner* — Premal R Patel
(74) *Attorney, Agent, or Firm* — Baker Botts L.L.P.

(57) ABSTRACT

In one embodiment, a method includes receiving motion data from a motion sensor during a packet-transmission interval of a wireless protocol. The motion data corresponds to a first pre-determined number of samples measured at a first sampling frequency. Each sample is associated with a first timestamp corresponding to a measurement time of that sample during the packet-transmission interval. The method also includes converting the motion data to correspond to a second pre-determined number of samples. The second pre-determined number is fewer than the first pre-determined number. The method also includes determining a second timestamp for each of the second pre-determined number of samples. The second timestamps are within the packet-transmission interval and represent measurement times at a second sampling frequency that is lower than the first sampling frequency. The method also includes combining the converted motion data and the corresponding second timestamps into a first data packet.

20 Claims, 7 Drawing Sheets

(56) References Cited

U.S. PATENT DOCUMENTS

| | | | | |
|---|---|---|---|---|
| 2016/0361021 A1* | 12/2016 | Salehizadeh | ......... | A61B 5/0245 |
| 2019/0038185 A1* | 2/2019 | Arnold | ................. | A61B 5/1123 |
| 2019/0179423 A1* | 6/2019 | Rose | ................. | G02B 27/0172 |
| 2019/0215660 A1* | 7/2019 | Slushtz | ................. | H04W 4/021 |

* cited by examiner

SENSOR DATA COMPRESSION

TECHNICAL FIELD

This disclosure generally relates to managing sensor data.

BACKGROUND

Artificial reality is a form of reality that has been adjusted in some manner prior presentation to a user. Artificial reality may include, e.g., virtual reality (VR), augmented reality (AR), mixed reality (MR), hybrid reality, or some combination and/or derivatives thereof. Artificial-reality content may include completely generated content or generated content combined with captured content (e.g., real-world photographs). In particular embodiments, the user may interact with a virtual object in a manner that is similar to the way a user interacts with physical objects within the user environment. In order to create a perception of an altered user environment, artificial reality systems may use a combination of visual, audio, and tactile effects. Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

A controller of an artificial reality system may include a number of sensors, such as for example a gyroscope, accelerometer, magnetometer, or any combination thereof. Inaccuracy in rendering the position of the controller in a virtual environment may be a function of the sampling rate of a gyroscope of the controller. In other words, a reduction in the gyroscope-sampling rate may lead to greater inaccuracy in rendering the position of the controller in the virtual environment. In the artificial reality system, position/orientation data captured by a sensor of the controller may be sent to a computing device to be used to render the position of the controller in the virtual environment. The data transfer between a controller and a headset may be limited by the bandwidth of a wireless protocol connecting these devices. Because of this bandwidth limitation, the transfer of data between the controller and headset may be limited to a pre-determined number of data packets of a fixed size that can be sent over a pre-determined period of time. Furthermore, the fixed size of each data packet may be capable of carrying a pre-determined number of samples or measurements (e.g., 3). In particular embodiments, the gyroscope of the controller may be configured to capture orientation data at a particular sampling frequency (e.g., 400 Hz), but the data may be sent by the controller at a transmission frequency (e.g., 100 Hz) that is based on the wireless protocol (e.g., BLUETOOTH LOW ENERGY).

In particular embodiments, the controller may overcome these limitations by generating a first data packet that includes multiple (e.g., 3) data readings sampled from the motion sensor at the particular sampling frequency (e.g., 400 Hz). As an example and not by way of limitation, motion sensor measurements measured at 400 Hz (4 measured samples for every transmitted packet at 100 Hz) may be down-sampled or under-sampled to 300 Hz (3 measured samples for every transmitted packet at 100 Hz) to conform to fixed size of the data packets of the wireless protocol. In particular embodiments, the down-sampled motion data may be converted by interpolating motion data measured at the sampling frequency (e.g., 400 Hz). As example and not by way of limitation, a first interpolated gyroscope data reading may be determined by interpolating a value of a first and second gyroscope measurement, and a second interpolated gyroscope measurement may be determined by interpolating the value of the second and third gyroscope measurement. The third measurement of the first data packet may be the value of the fourth gyroscope measurement. A second data packet may include a magnetometer measurement and an accelerometer measurement at the transmission frequency (e.g., 100 Hz) may be sent after sending the first data packet.

In particular embodiments, a headset of an artificial reality system may estimate when a data packet was measured by the controller relative to a headset's clock or an absolute clock. An estimate of when the samples of sensor data were measured may enable more accurate pose and orientation rendering in the virtual environment. When the controller is powered on, the controller and headset perform a handshake procedure to establish a wireless connection between these devices. Once the wireless connection is established, data packets may be sent to the headset from the controller though the wireless connection. As described above, the data from the controller includes sensor data (e.g., gyroscope data) and a timestamp of when the sensor data was measured according to the clock of the controller. Even though the first data packet may include a timestamp, the timestamp is determined using the clock of the controller and does not directly inform the headset of when the motion data was measured relative to the headset's clock or an absolute clock. For each first data packet that the headset receives, the headset may estimate when the sensor data was measured relative to the local clock of the controller or an absolute clock. In particular embodiments, this estimation may be based on one-way communication from the controller to the headset, using only the data available from the controller (e.g., timestamp) and without the use of extra counters or other data embedded in the data packets.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

A controller of an artificial reality system may include a number of sensors, such as for example a gyroscope, accelerometer, magnetometer, or any combination thereof. Inaccuracy in rendering the position of the controller in a virtual environment may be a function of the sampling rate of a gyroscope of the controller. In other words, a reduction in the gyroscope-sampling rate may lead to greater inaccuracy in rendering the position of the controller in the virtual environment. In the artificial reality system, position/orientation data captured by a sensor of the controller may be sent to a computing device to be used to render the position of the controller in the virtual environment. The data transfer between a controller and a headset may be limited by the bandwidth of a wireless protocol connecting these devices.

In particular embodiments, a maximum rate that data samples may be sent using the wireless protocol (e.g., BLUETOOTH) may not be compatible with the sampling rate of the sensors, as described below. Because of this bandwidth limitation or incompatibility, the transfer of data between the controller and headset may be limited to a pre-determined number of data packets of a fixed size that can be sent over a pre-determined period of time. Furthermore, the fixed size of each data packet may be capable of carrying a pre-determined number of samples or measurements (e.g., 3). In particular embodiments, the gyroscope of the controller may be configured to capture orientation data at a particular sampling frequency (e.g., 400 Hz), but the data may be sent by the controller at a transmission frequency (e.g., 100 Hz) that is based on the wireless protocol (e.g., BLUETOOTH LOW ENERGY).

In particular embodiments, the controller may overcome these limitations by generating a first data packet that includes multiple (e.g., 3) data readings sampled from the motion sensor at the particular sampling frequency (e.g., 400 Hz). As an example and not by way of limitation, motion sensor measurements measured at 400 Hz (4 measured samples for every transmitted packet at 100 Hz) may be down-sampled or under-sampled to 300 Hz (3 measured samples for every transmitted packet at 100 Hz) to conform to fixed size of the data packets of the wireless protocol. In particular embodiments, the down-sampled motion data may be converted by interpolating motion data measured at the sampling frequency (e.g., 400 Hz). As example and not by way of limitation, a first interpolated gyroscope data reading may be determined by interpolating a value of a first and second gyroscope measurement, and a second interpolated gyroscope measurement may be determined by interpolating the value of the second and third gyroscope measurement. The third measurement of the first data packet may be the value of the fourth gyroscope measurement. A second data packet may include a magnetometer measurement and an accelerometer measurement at the transmission frequency (e.g., 100 Hz) may be sent after sending the first data packet.

In particular embodiments, a headset of an artificial reality system may estimate when a data packet was measured by the controller relative to a headset's clock or an absolute clock. An estimate of when the samples of sensor data were measured may enable more accurate pose and orientation rendering in the virtual environment. When the controller is powered on, the controller and headset perform a handshake procedure to establish a wireless connection between these devices. Once the wireless connection is established, data packets may be sent to the headset from the controller though the wireless connection. As described above, the data from the controller includes sensor data (e.g., gyroscope data) and a timestamp of when the sensor data was measured according to the clock of the controller. Even though the first data packet may include a timestamp, the timestamp is determined using the clock of the controller and does not directly inform the headset of when the motion data was measured relative to the headset's clock or an absolute clock. For each first data packet that the headset receives, the headset may estimate when the sensor data was measured relative to the local clock of the controller or an absolute clock. In particular embodiments, this estimation may be based on one-way communication from the controller to the headset, using only the data available from the controller (e.g., timestamp) and without the use of extra counters or other data embedded in the data packets.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional (3-D) effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Figure 1:
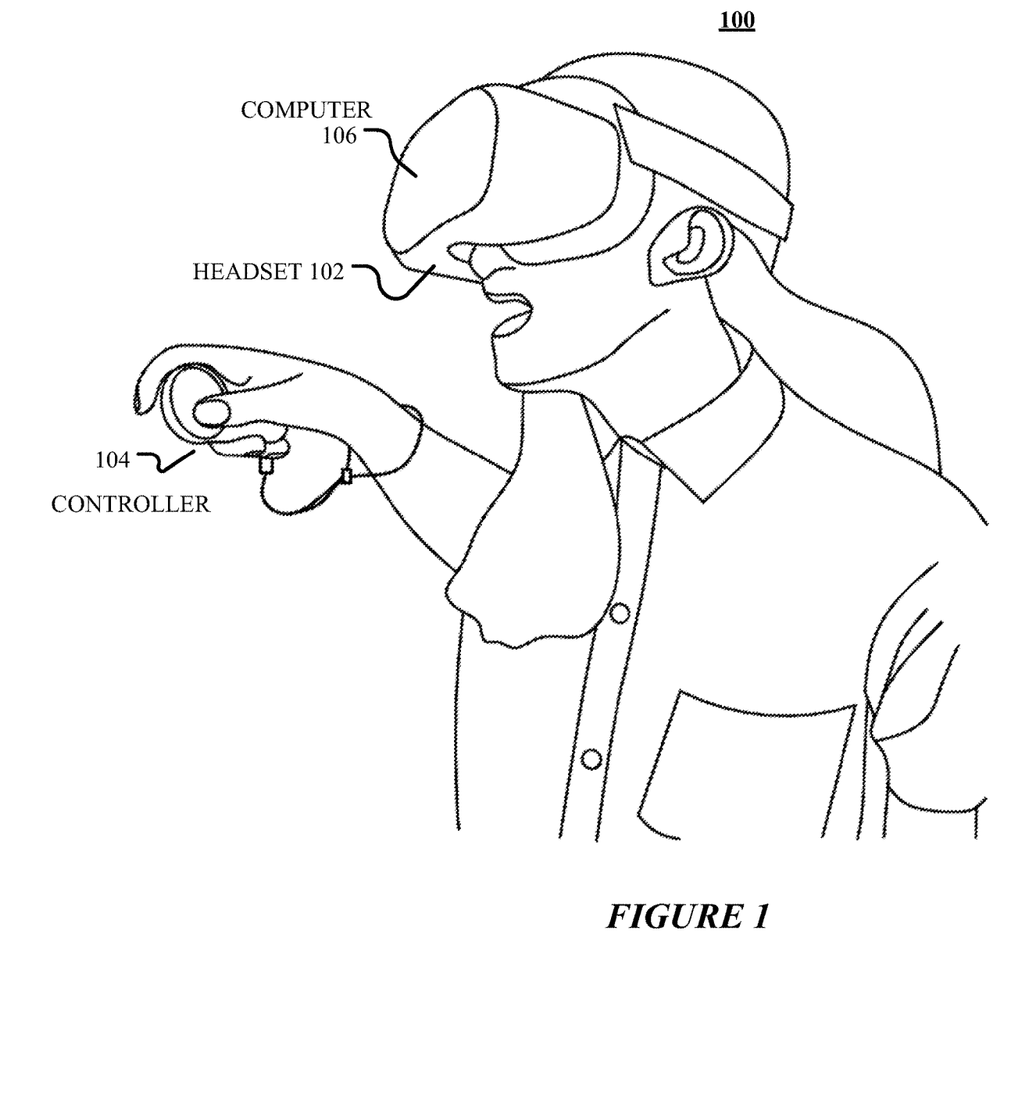
FIG. 1 illustrates an example artificial reality system.

FIG. 1 illustrates an example artificial reality system. In particular embodiments, artificial reality system 100 may include a headset 102 (e.g., a head-mounted display (HMD)) and one or more controllers 104. Herein, the terms "headset" and "head-mounted display" may be used interchangeably to refer to a head-mounted device for artificial reality system 100. A user may wear headset 102 that is configured to display VR or AR content to the user on one or more display screens of headset 102. In particular embodiments, headset 102 may include computing system 106. In addition, headset 102 may include one or more cameras which can capture images and videos of environments. Although this disclosure illustrates and describes a particular headset configuration that includes computing system 106, this disclosure contemplates a separate headset connected to any suitable computing system such as for example, a standalone host computer system, a mobile device, or any other hardware platform capable of providing artificial reality content to and receiving input from the user.

Controller 104 may be connected to the headset 102 through a wired (e.g., Ethernet) or wireless connection. In particular embodiments, controller 104 may receive input from the user and sends the input to computing system 106 of headset 102. Controller 104 may also include one or more types of sensors to track movements that may be part of the input from the user. As an example and not by way of limitation, controller 104 may include a gyroscope, accelerometer, magnetometer, or any combination thereof. A gyroscope is a sensor that is configured to measure angular velocity along three axes (e.g., pitch, roll, and yaw). The displacement of the controller may be determined by integrating of amount of rotation measured by the gyroscope. An accelerometer is a sensor that is configured to measure acceleration and gravity, and the magnetometer is a sensor that is configured to measure the magnetic field in three dimensions (3-D) around the proximity of controller 104. Computing system 106 of headset 102 may receive and use data from the sensors of controller 104 to determine the position or orientation of controller 104. As described above, controller 104 and headset 102 may each include a clock with different capabilities (e.g., accuracy or resolution).

As described above, data packets are sent from the controller to the headset of the artificial reality system and may include a payload and metadata. As an example and not by way of limitation, the payload and the metadata may include one or more samples of sensor data and a timestamp, respectively. For example, a gyroscope sample may include a timestamp, the temperature, and a payload of numbers representing the rotation rate as measured by the gyroscope. In particular embodiments, the transmission of data packets may be designed to send a maximum number of samples of gyroscope data to accurately capture users' motion (through a controller), and less frequently accelerometer and magnetometer samples for correcting the orientation estimate based on the gyroscope data.

Each type of sensors of the controller has an associated sampling rate that is the number of samples generated by type of sensor per second in ideal conditions and the actual number of samples captured per second may be different and may vary with time. In addition, the controller sends the data packets at a rate is based on the wireless protocol used to connect the controller with the headset. As an example and not by way of limitation, the controller may be limited to sending 200 packets every second (200 Hz.) due to the bandwidth of a BLE connection between the controller and headset. In particular embodiments, the first data packet including gyroscope data may be sent at a rate of 100 data packets per second and a second data packet including accelerometer and magnetometer data may be interleaved between first data packets at a rate of 100 packets per second.

Figure 2:
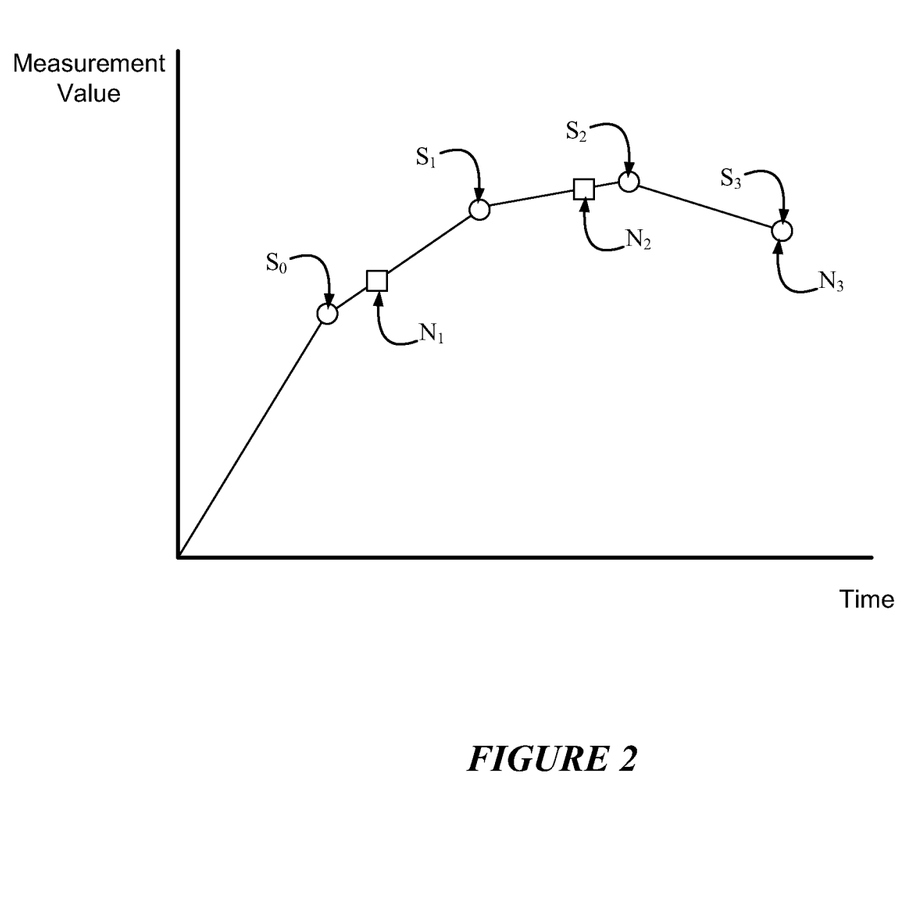
FIG. 2 illustrates an example motion data interpolation.

FIG. 2 illustrates an example motion data interpolation. As described above, the amount of motion data per first data packet may be maximized by the controller and the headset may reconstruct the controller motion based on this compressed data. In a case where there is a mismatch between the sampling rate of the motion sensor (e.g., 400 Hz.) and the amount of data that may be included in the payload of the first data packet (e.g., 3 samples at 100 Hz.), the controller may reduce a number of gyroscope samples (e.g., 4 samples at 100 Hz.) to a smaller number of samples (e.g., 3 samples at 100 Hz). As an example and not by way of limitation, a gyroscope with a 400 Hz. sampling rate may capture 4 samples of sensor data for each first data packet with a payload of 3 samples of sensor data. Therefore, the 4 samples of sensor data should be converted to 3 samples of sensor data for the payload of the first data packet. In particular embodiments, a first interpolated sample $N_1$ may be determined based on an interpolation of a first measured sample $S_0$ and second measured sample $S_1$. Similarly, a second interpolated sample $N_2$ may be determined based on an interpolation of a second measured sample $S_1$ and third measured sample $S_2$. The third interpolated sample may be the unmodified fourth measured sample $S_3$.

In particular embodiments, first interpolated sample $N_1$, a second interpolated sample $N_2$, and third measured sample $S_2$ may be determined based on equations (1), (2), and (3), respectively:

$$N_1 = (S_0 \times 2 + S_1)/3 \quad (1)$$

$$N_2 = (S_1 + S_2 \times 2)/3 \quad (2)$$

$$N_3 = S_3 \quad (3)$$

where, $S_0$, $S_1$, $S_2$ and $S_3$ are the raw values of samples captured by the controller at the sampling rate of the sensor (e.g., 400 Hz.). This interpolation requires limited floating-point processing by a processor of the controller. In particular embodiments, a linear function may be applied interpolated samples $N_1$, $N_2$, and $N_3$. Although this disclosure illustrates and describes a particular interpolation of sample values, this disclosure contemplates any suitable interpolation of sample values.

Figure 3:
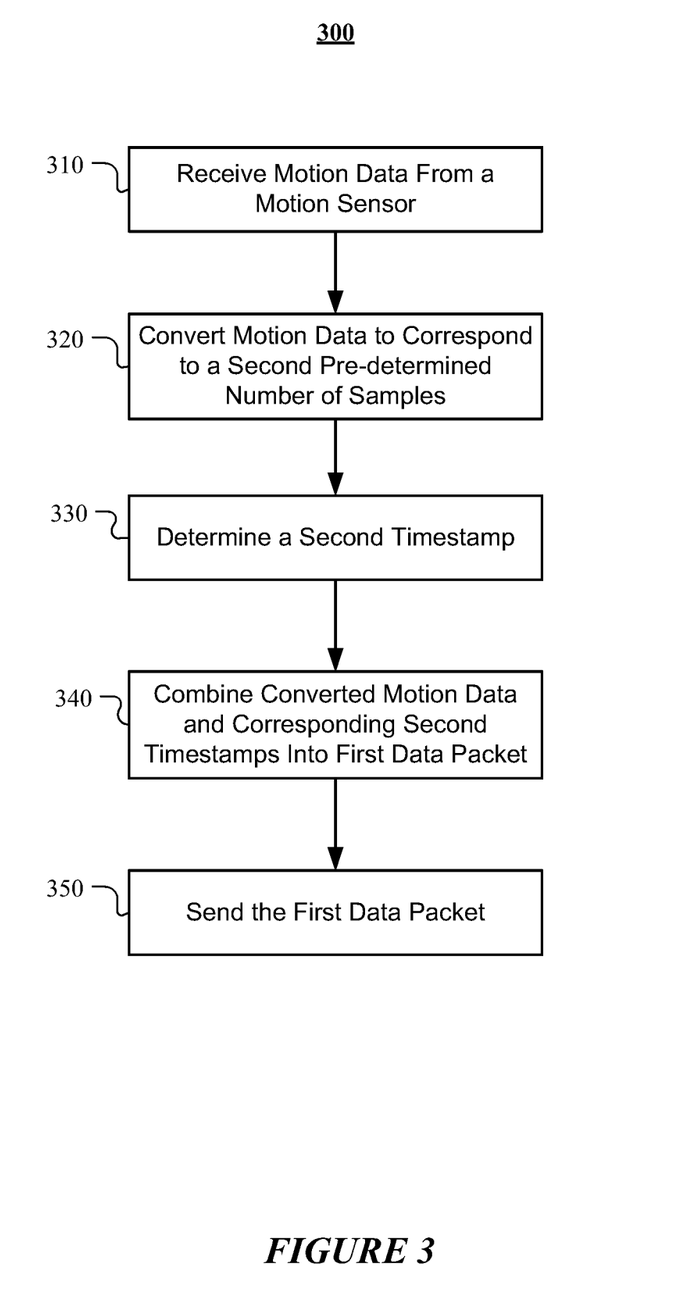
FIG. 3 illustrates an example method for compressing motion data.

FIG. 3 illustrates an example method for compressing motion data. The method 300 may begin at step 310, where a computing device receives motion data from a motion sensor during a packet-transmission interval of a wireless protocol. In particular embodiments, the motion data corresponds to a first pre-determined number of samples measured at a first sampling frequency. Each sample may be associated with a first timestamp corresponding to a measurement time of that sample during the packet-transmission interval (e.g., transmission rate of a BLE connection). In particular embodiments, the motion sensor may be a gyroscope of a controller of an artificial reality system. At step 320, the computing device may convert the motion data to correspond to a second pre-determined number of samples. The second pre-determined number may be fewer than the first pre-determined number. In particular embodiments, the conversion may be determined by interpolating the samples of the received motion data. At step 330, the computing device may determine a second timestamp for each of the second pre-determined number of samples. The second timestamps are within the packet-transmission interval and represent measurement times at a second sampling frequency that is lower than the first sampling frequency. In particular embodiments, the second timestamps may be determined by interpolating one or more first timestamps of the motion data. At step 340, the computing device may combine the converted motion data and the corresponding second timestamps into a first data packet. In particular embodiments, the first data packet conforms to the BLE wireless protocol. At step 350, the computing device sends the first data packet using the wireless protocol having a packet-transmission frequency that is lower than the first sampling frequency and the second sampling frequency. In particular embodiments, the first data packet is configured to be used for generating at least a portion of a virtual-reality or mixed-reality environment that is responsive to user motion.

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for compressing motion data including the particular steps of the method of FIG. 3, this disclosure contemplates any suitable method for compressing motion data including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
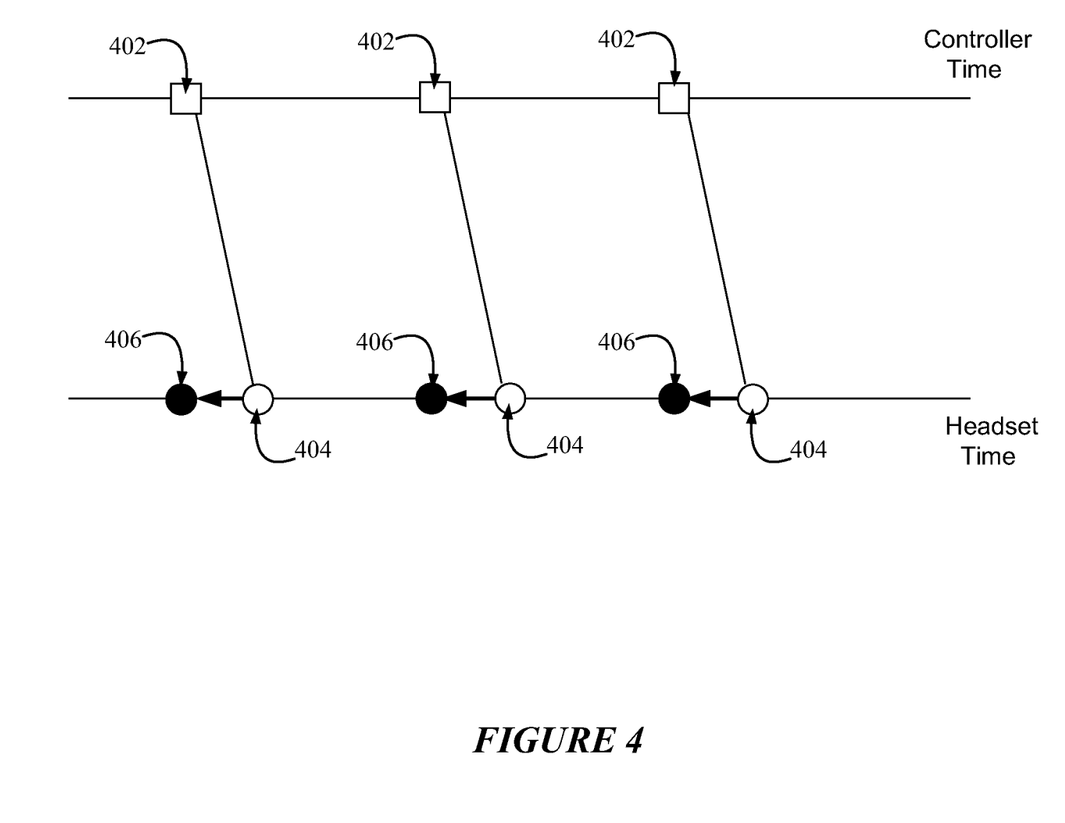
FIG. 4 illustrates an example clock synchronization for motion data.

FIG. 4 illustrates an example clock synchronization for motion data. As described above, one or more controllers that are remotely connected to a headset of an artificial reality system may use an on-board clock to measure time, which may be different from a local clock of the headset. As an example and not by way of limitation, the controller clock and the local clock of the headset may have an offset due to starting at different times, and a skew between these clocks may arise from the clocks running at different rates. The artificial reality system renders the virtual environment at least in part on the position/orientation of the controller. Particular embodiments, describe a method of converting sample time 402 from one source (e.g. controller clock) to synchronization time 406 of another source (e.g. headset local clock) for more accurate estimates of the position of the controller and to responsively render the virtual environment.

The motion sensor (e.g., gyroscope) may send data to a processor of the controller indicating that motion data is available. The processor of the controller may save the sensor data and the measurement or sample time of the respective sample. The sample time 402 is the time when a sample was generated or measured according to controller clock. As described above, the controller may capture and store several packets of motion data from the motion sensor and the associated timestamps from the clock of the controller. As described above, the controller may combine the motion data of several samples (e.g., 3 samples) and the timestamp (e.g., sample time 402) of the last sample into a payload of a first data packet. The controller then transmits the first data packet to the headset. a processor of the headset may record the time according to the local clock of the headset that each packet is received (receive time 404) and this receive time 404 is associated with the respective data packet.

As described below, a learned relationship (e.g., linear model) may be used to model the relationship between the sample time 402 measured by the controller clock and the receive time 404 measured by the local clock of the headset. In particular embodiments, a simplified version of the learned relationship (assuming the clock skew is 1.0), illustrated by the example of equation (4), may be used to estimate the value of the parameters of the learned relationship (e.g., the offset between the controller clock and the local clock of the headset).

$$\text{ReceivedTime}[n] = \text{SampleTime}[n] + O_{controller} + O_{latency} \quad (4)$$

where ReceivedTime[n] is the time according to the local clock of the headset that nth packet is received, SampleTime[n] is time of the motion data of the nth packet was measured based the controller clock, $O_{controller}$ is a variable offset between the two clocks, and $O_{latency}$ is a constant that is used to capture the other system latencies. SampleTime[n] may be determined using the timestamp (e.g., sample time 402) of the nth packet sent by the controller. In particular embodiments, a value for $O_{latency}$ may be estimated based on estimating a time for a processor of the controller to write the motion data to a first data packet, the transmission time of the wireless protocol connecting the headset and the controller, and time it takes for the processor of the headset to get the first data packets from headset protocol stack, and these values may be estimated through experimentation. $O_{latency}$ may be assumed to have a Gaussian distribution.

In particular embodiments, when additional data packets are received, the learned relationship between the received time and the sample time is illustrated in the example of equation (5).

$$\text{ReceivedTime} = k_{skew} \times \text{SampleTime} + O_{controller} + O_{latency} + \text{noise} \quad (5)$$

where ReceivedTime, SampleTime, $O_{controller}$, and $O_{latency}$ are described above, the variable $k_{skew}$ is introduced to handle the case where the controller clock operates at a slightly different rate than the headset clock, and noise is a variable that captures unmodeled latencies and may be used to model random perturbations of $O_{latency}$, including packet delays and operating system (OS) scheduling. As an example and not by way of limitation, the value of noise may be much smaller than the value of $O_{latency}$. In particular embodiments, the values of $k_{skew}$ and $O_{controller}$ may be determined based on the least-square fit of equation (5) to the sample time 402 and receive time 404 of the first data packets. As described above, the payload of the first data sample may have the timestamp (sample time 402) of the most recent sample. In particular embodiments, the processor may estimate the sample time 402 of the other samples of the first data packet based on one timestamp contained in the payload of the first data packet, assuming a pre-determined sampling rate (e.g., 300 Hz.) of the samples of the first data packet. As an example and not by way of limitation, the headset may infer the sample time 402 of the first interpolated sample $N_1$ and the second interpolated sample $N_2$ may be determined based on equations (6) and (7), respectively:

$$GS_1 = ST - 2/300 \quad (6)$$

$$GS_2 = ST - 1/300 \quad (7)$$

where ST is the timestamp of the respective first data packet, $GS_1$ is the inferred sample time of first interpolated sample $N_1$ and $GS_2$ is the inferred sample time of the second interpolated sample $N_2$.

In particular embodiments, a processor of the headset may estimate the time of the local clock of the headset that each sample of the first data packet was captured by the controller (synchronization time 406) based on either the timestamp ST of the respective first data packet or inferred sample times $GS_1$ and $GS_2$. The sample time based on the local clock of the controller may be determined using equation (8).

$$\text{SynchTime} = k_{skew} \times \text{SampleTime} + O_{controller} \quad (8)$$

where SynchTime is the sample time of the respective sample based on the local clock of the controller, SampleTime is either the time of the timestamp or inferred sample times $GS_1$ and $GS_2$, and $k_{skew}$ is the value calculated from equation (5) described above. SynchTime is related to ReceivedTime by $O_{controller}$. In other words, the time a data packet is received by the controller is a combination of the time the sample was measured (sample time 402) plus the offset between the local clock of the controller and the headset clock.

In particular embodiments, data that includes sample time 402 of each sample (based on the controller clock), synchronization time 406 of the respective sample based on the local clock of the headset, and the data of the respective sample may be sent to an orientation tracking algorithm executed by a computing system of the artificial reality system. The computing system the artificial reality system may then use this data estimate the controller's orientation and send data to the headset rendering the virtual environment based on the orientation of the controller. Although this disclosure illustrates and describes calculations for determining the correlation between the time of the controller clock and the time of the local clock of the headset, this disclosure contemplates any suitable calculations for determining the correlation between the time of the controller clock and the time of the local clock of the headset.

Figure 5:
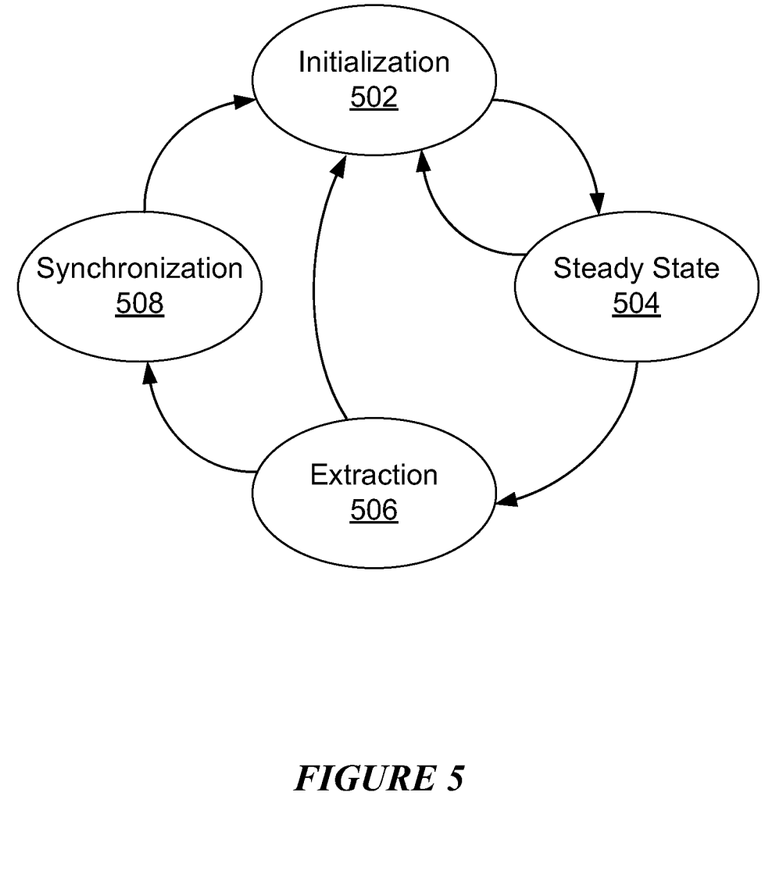
FIG. 5 illustrates an example state machine for synchronizing a controller clock to a headset clock.

FIG. 5 illustrates an example state machine for synchronizing a controller clock to a headset clock. At state 502, initialization phase where the artificial reality system has been initialized and the start-up processes are initiated. As an example and not by way of limitation, the initialization state may include a BLE handshaking between the controller and headset. At state 504, the headset monitors the receive time of the data packets sent by the controller to detect whether the data packets from the controller are being received at a steady packet rate. Having a steady packet rate may be an indication that the system is in equilibrium. After the AR system is initialized and is operating in a steady state, one or more of the learned relationship parameters (e.g., $k_{skew}$ or $O_{controller}$) may be updated using every sample received from the controller. This updating of the learned relationship parameters may compensate potential clock drift or and controller power cycling. As an example and not by way of limitation, $k_{skew}$ may be affected by temperature and change over time, or $O_{controller}$ may be reset to another value in the event that the controller power is cycled, respectively.

At state 506, if data packets that are sent by the controller but did not arrive at the receiving side, it may be difficult for the processor of the headset to reliably determine the synchronization time of the data packets (SynchTime), described above. In this case, the state machine may transition from state 506 back to the initialization state 502. At state 508, the headset computes the synchronization time as illustrated in the example of equations (5) and (8) described above. In particular embodiments, packets with a timestamp that is within a pre-determined range of the expected time based on equation (5) may be used to update the value of the learned relationship parameters (e.g., $k_{skew}$ or $O_{controller}$). As described above, state 506 may use the learned relationship of equation (5) and (8) to find the synchronization between the headset clock and the controller clock based on a least-square fit of the receive time and sample time of the first data packets.

Figure 6:
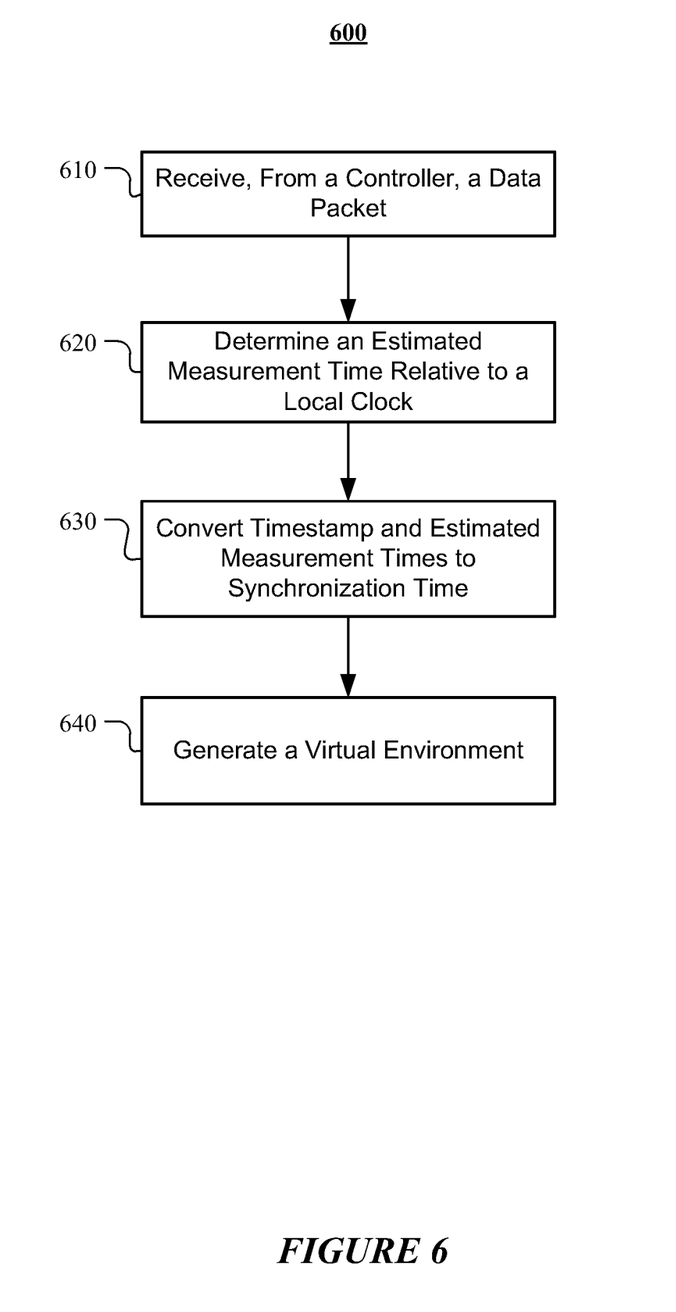
FIG. 6 illustrates an example method for synchronizing a controller clock to a headset clock.

FIG. 6 illustrates an example method for synchronizing a controller clock to a headset clock. The method 600 may begin at step 610, where a computing device receives, from a controller, a data packet including a number of samples that each corresponding to measurements from a motion sensor, and a timestamp corresponding to a measurement time of one of the samples as measured by a clock of the controller. At step 620, the computing device determines, based on the timestamp, an estimated measurement time relative to a local clock for each of the number of samples that is not associated with the timestamp. At step 630, the computing device converts each of the timestamp and the estimated measurement times to a corresponding synchronization time using a learned relationship relating the clock of the controller and the local clock. In particular embodiments, the learned relationship is iteratively learned based on previously received data packets from the controller. The synchronization time associated with each of the number of samples represents an estimated time, relative to the local clock, at which the sample was measured. At step 640, the computing device generates a virtual environment based on the plurality of samples and their respective synchronization times. In particular embodiments, the generation of the virtual environment is based on the converted sample time (e.g., timestamp of the respective sample or inferred sample time described above) according to the local clock of the controller and the data of the respective sample.

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for synchronizing a controller clock to a headset clock including the particular steps of the method of FIG. 6, this disclosure contemplates any suitable method for synchronizing a controller clock to a headset clock including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

As described above, the transmission of data packets from the controller may be designed to send a maximum number of samples of gyroscope data to more accurately capture a user's motion (through a controller), and less frequently send accelerometer and magnetometer samples for correcting the orientation estimate based on the gyroscope data. A gyroscope is limited in the maximum speed of movement that may be detected (e.g., 2000° per second). Movement of the controller that is faster than the detection limit of the gyroscope may result in motion saturation, where motion data is not accurately captured and is limited to the maximum speed of movement. As an example and not by way of limitation, when the controller is rotating at 3000° per second, the gyroscope may detect up to 2000° of rotation per second. This motion saturation of the gyroscope may result in a large instantaneous drift in the virtual environment or inaccuracy between the virtual position of the controller and the actual position of the controller. If uncorrected, this gyroscope drift may be cumulative every time the gyroscope saturates. In particular embodiments, the accelerometer of the controller may be used to correct pitch and roll of the controller after gyroscope saturation. Once the gyroscope of the controller is no longer saturated and the controller has a low amount of motion (e.g., substantially stationary), the accelerometer may be used to determine the downward direction of the controller based on the measured acceleration due to gravity. This downward direction may be used to correct the pitch and roll of the controller.

In particular embodiments, readings from the magnetometer may be used to correct the drift in the yaw of the controller due to motion saturation, described above. As an example and not by way of limitation, a magnetic map around the user may be captured while the controller is being used. The magnetic map may include entries of the orientation of the controller (from the gyroscope) and the associated magnetometer reading in 3-D. Once motion saturation of the gyroscope is detected, the headset may wait until the controller is no longer moving fast and sample the magnetometer. The current magnetometer reading may be compared to the entries of the 3-D magnetic map and the entry having the magnetometer reading closest to the current magnetometer reading is identified. In particular embodiments, the orientation associated with the corresponding entry of the magnetic map, adjusted by the difference in the current magnetometer reading and the identified magnetometer reading from the 3-D magnetic map, may be used to correct the yaw of the controller.

In particular embodiments, drift in the controller in the case when the gyroscope is not saturated may be compensated using a multiple-reference-point drift correction. The multiple-reference-point drift correction accounts for distortions in the magnetic-field model caused by external interference from nearby magnetic material, magnetometer offset, scaling error, or misalignment. In particular embodiments, the magnetic sensor readings and the associated orientation of the 3-D magnetic map may be distributed to evenly cover the space around the controller. As an example and not by way of limitation, the magnetometer readings of the controller may be saved to the 3-D magnetic map when associated orientation is at least threshold number of degrees separated from previously saved entries of the 3-D magnetic map. In particular embodiments, current magnetometer readings are compared to the entries of the 3-D magnetic map to identify the entry with the closest value. The current magnetometer reading is rotated by its respective orientation and the magnetometer reading of the identified entry is rotated by the orientation of the identified entry, such that both orientations are aligned to a reference frame of the external environment. In particular embodiments, the orientation associated with the corresponding entry of the magnetic map, adjusted by the difference in the current magnetometer reading and the identified magnetometer reading from the 3-D magnetic map, may be used to correct the yaw of the controller.

Since accelerometer data may primarily be used to determine the pitch and roll of the controller, the accelerometer data may be improved if the yaw component is set to zero. However, the accelerometer data may include a non-zero yaw component due to shaking of the controller inducing an acceleration leading to a significant yaw component. In particular embodiments, measurements of the accelerometer may be captured and tracked in quaternions (e.g., w, x, y, z coordinates). These accelerometer readings may then be converted to Euler angles (e.g., x, y, z coordinates) which includes the yaw component. This yaw component may be zeroed out in the Euler angle coordinate system. The Euler coordinates with the zeroed-out yaw component may be then converted back to quaternion coordinates, which now do not include any yaw component. In particular embodiments, these accelerometer measurements in quaternion coordinates may be used to correct pitch and roll of the controller after motion saturation.

Figure 7:
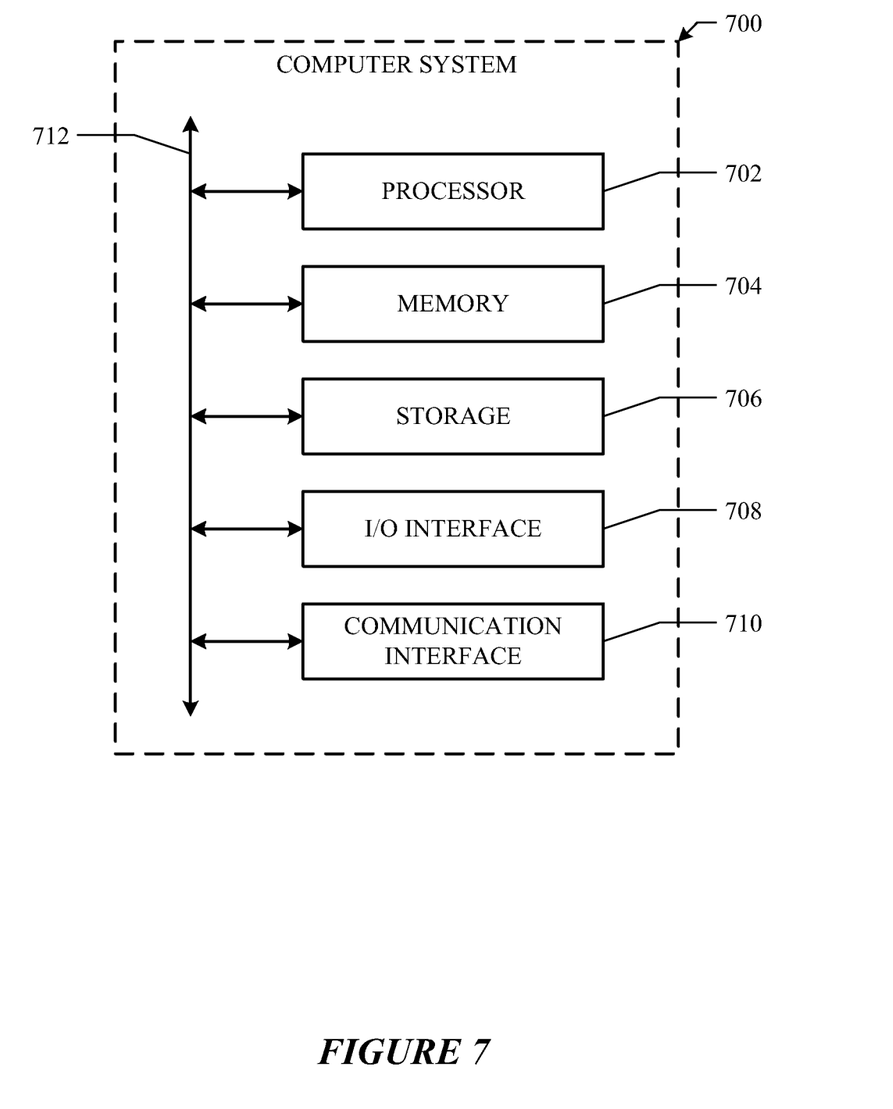
FIG. 7 illustrates an example computer system.

FIG. 7 illustrates an example computer system. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A method comprising:
  by one or more computing devices, receiving motion data from a motion sensor during a packet-transmission interval of a wireless protocol, wherein:
    the motion data corresponds to a first pre-determined number of samples measured at a first sampling frequency; and
    each sample is associated with a first timestamp corresponding to a measurement time of that sample during the packet-transmission interval;
  by the one or more computing devices, converting the motion data to correspond to a second pre-determined number of samples, wherein the second pre-determined number is fewer than the first pre-determined number;
  by the one or more computing devices, determining a second timestamp for each of the second pre-determined number of samples, wherein the second timestamps are within the packet-transmission interval and represent measurement times at a second sampling frequency that is lower than the first sampling frequency;
  by the one or more computing devices, combining the converted motion data and the corresponding second timestamps into a first data packet; and
  by the one or more computing devices, sending the first data packet using the wireless protocol having a packet-transmission frequency that is lower than the first sampling frequency and the second sampling frequency, wherein the first data packet is configured to be used for generating at least a portion of a virtual-reality or mixed-reality environment that is responsive to user motion.

2. The method of claim 1, wherein converting the motion data comprises:
  interpolating a value of the motion sensor measured at an initial measurement time and a subsequent measurement time; and
  interpolating a value of the motion sensor measured at an ending measurement time and a previous measurement time.

3. The method of claim 1, wherein determining the second timestamps comprises:
  interpolating a timestamp of data measured at an initial measurement time and a subsequent measurement time; and
  interpolating a timestamp measured at an ending measurement time and a previous measurement time.

4. The method of claim 1, further comprising:
  integrating data from an accelerometer and magnetometer having a corresponding third timestamp into a second data packet, wherein the data from the accelerometer and magnetometer is measured at the packet-transmission frequency; and
  sending the second data packet between successive first data packets using the wireless protocol, wherein the second data packet comprises data used to correct motion measured by the motion sensor.

5. The method of claim 4, wherein the second data packet further comprises input data of a user modifying the mixed-reality environment through a controller held by the user.

6. The method of claim 1, wherein the sending the first data packet comprises sending the first data packet to a headset of a mixed-reality system through a BLUETOOTH LOW ENERGY wireless protocol.

7. The method of claim 1, wherein the second pre-determined number of samples is based on the packet-transmission frequency.

8. One or more computer-readable non-transitory storage media embodying software that is operable when executed to:
receive motion data from a motion sensor during a packet-transmission interval of a wireless protocol, wherein:
the motion data corresponds to a first pre-determined number of samples measured at a first sampling frequency; and
each sample is associated with a first timestamp corresponding to a measurement time of that sample during the packet-transmission interval;
convert the motion data to correspond to a second pre-determined number of samples, wherein the second pre-determined number is fewer than the first pre-determined number;
determine a second timestamp for each of the second pre-determined number of samples, wherein the second timestamps are within the packet-transmission interval and represent measurement times at a second sampling frequency that is lower than the first sampling frequency;
combine the converted motion data and the corresponding second timestamps into a first data packet; and
send the first data packet using the wireless protocol having a packet-transmission frequency that is lower than the first sampling frequency and the second sampling frequency, wherein the first data packet is configured to be used for generating at least a portion of a virtual-reality or mixed-reality environment that is responsive to user motion.

9. The media of claim 8, wherein the software is further operable to:
interpolate a value of the motion sensor measured at an initial measurement time and a subsequent measurement time; and
interpolate a value of the motion sensor measured at an ending measurement time and a previous measurement time.

10. The media of claim 8, wherein the software is further operable to:
interpolate a timestamp of data measured at an initial measurement time and a subsequent measurement time; and
interpolate a timestamp measured at an ending measurement time and a previous measurement time.

11. The media of claim 8, wherein the software is further operable to:
integrate data from an accelerometer and magnetometer having a corresponding third timestamp into a second data packet, wherein the data from the accelerometer and magnetometer is measured at the packet-transmission frequency; and
send the second data packet between successive first data packets using the wireless protocol, wherein the second data packet comprises data used to correct motion measured by the motion sensor.

12. The media of claim 11, wherein the second data packet further comprises input data of a user modifying the mixed-reality environment through a controller held by the user.

13. The media of claim 8, wherein the software is further operable to send the first data packet to a headset of a mixed-reality system through a BLUETOOTH LOW ENERGY wireless protocol.

14. The media of claim 8, wherein the second pre-determined number of samples is based on the packet-transmission frequency.

15. A system comprising:
one or more processors; and
a memory coupled to the processors comprising instructions executable by the processors, the processors being operable when executing the instructions to:
receive motion data from a motion sensor during a packet-transmission interval of a wireless protocol, wherein:
the motion data corresponds to a first pre-determined number of samples measured at a first sampling frequency; and
each sample is associated with a first timestamp corresponding to a measurement time of that sample during the packet-transmission interval;
convert the motion data to correspond to a second pre-determined number of samples, wherein the second pre-determined number is fewer than the first pre-determined number;
determine a second timestamp for each of the second pre-determined number of samples, wherein the second timestamps are within the packet-transmission interval and represent measurement times at a second sampling frequency that is lower than the first sampling frequency;
combine the converted motion data and the corresponding second timestamps into a first data packet; and
send the first data packet using the wireless protocol having a packet-transmission frequency that is lower than the first sampling frequency and the second sampling frequency, wherein the first data packet is configured to be used for generating at least a portion of a virtual-reality or mixed-reality environment that is responsive to user motion.

16. The system of claim 15, wherein the processors are further operable to:
interpolate a value of the motion sensor measured at an initial measurement time and a subsequent measurement time; and
interpolate a value of the motion sensor measured at an ending measurement time and a previous measurement time.

17. The system of claim 15, wherein the processors are further operable to:
interpolate a timestamp of data measured at an initial measurement time and a subsequent measurement time; and
interpolate a timestamp measured at an ending measurement time and a previous measurement time.

18. The system of claim 15, wherein the processors are further operable to:
integrate data from an accelerometer and magnetometer having a corresponding third timestamp into a second data packet, wherein the data from the accelerometer and magnetometer is measured at the packet-transmission frequency; and
send the second data packet between successive first data packets using the wireless protocol, wherein the second data packet comprises data used to correct motion measured by the motion sensor.

19. The system of claim 18, wherein the second data packet further comprises input data of a user modifying the mixed-reality environment through a controller held by the user.

20. The system of claim 15, wherein the software is further operable to send the first data packet to a headset of a mixed-reality system through a BLUETOOTH LOW ENERGY wireless protocol.

* * * * *